US011802762B2

(12) United States Patent
Huang et al.

(10) Patent No.: US 11,802,762 B2
(45) Date of Patent: *Oct. 31, 2023

(54) LASER-BASED MEASUREMENT DEVICE AND MOVABLE PLATFORM

(71) Applicant: SZ DJI TECHNOLOGY CO., LTD., Shenzhen (CN)

(72) Inventors: Huai Huang, Shenzhen (CN); Wei Ren, Shenzhen (CN); Peng Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/572,163

(22) Filed: Jan. 10, 2022

(65) Prior Publication Data
US 2022/0128351 A1 Apr. 28, 2022

Related U.S. Application Data

(63) Continuation of application No. 16/587,495, filed on Sep. 30, 2019, now Pat. No. 11,221,212, which is a
(Continued)

(51) Int. Cl.
*G01B 11/26* (2006.01)
*B23K 26/03* (2006.01)
*B23K 26/00* (2014.01)

(52) U.S. Cl.
CPC ............ *G01B 11/26* (2013.01); *B23K 26/032* (2013.01); *B23K 26/009* (2013.01)

(58) Field of Classification Search
CPC ........ G01S 17/06; G01S 7/4817; G01S 17/42; G01S 7/4816; G01J 1/0488; G01J 1/44;
(Continued)

(56) References Cited

U.S. PATENT DOCUMENTS 8,400,625 B1 * 3/2013 Young .................... G01B 11/27
356/152.3
2003/0141466 A1 * 7/2003 Ohtomo ............... G01C 15/002
250/559.38
(Continued)

FOREIGN PATENT DOCUMENTS

CN 2543298 Y 4/2003
CN 103852888 A 6/2014
(Continued)

OTHER PUBLICATIONS

The World Intellectual Property Organization (WIPO) International Search Report for PCT/CN2017/078619 dated Jan. 8, 2018 8 Pages.

*Primary Examiner* — Isiaka O Akanbi
(74) *Attorney, Agent, or Firm* — ANOVA LAW GROUP, PLLC

(57) ABSTRACT

A laser-based measurement device includes a laser transmitter; a laser receiver; an optical device configured to guide a laser beam emitted by the laser transmitter out of the laser-based measurement device and guide the laser beam reflected by an external environment in the laser receiver; and a driving device including a first magnetic member connected to the optical device and a second magnetic member. The driving device is configured to drive the optical device to vibrate through interaction between the first magnetic member and the second magnetic member, to change a guiding direction of the laser beam passing through the optical device.

20 Claims, 15 Drawing Sheets

Related U.S. Application Data continuation of application No. PCT/CN2017/078619, filed on Mar. 29, 2017.

(58) Field of Classification Search
CPC ..... G01J 1/0414; G01B 11/26; B23K 26/032; B23K 26/009
USPC ........................ 356/138, 4.01, 4.1, 5.01, 5.15
See application file for complete search history.

(56) References Cited

U.S. PATENT DOCUMENTS

| | | | |
|---|---|---|---|
| 2009/0002678 A1 | 1/2009 | Tanaka et al. | |
| 2013/0229645 A1* | 9/2013 | Suzuki | G01S 17/02 356/5.01 |
| 2016/0025488 A1* | 1/2016 | Wood | H04N 23/75 356/4.01 |
| 2017/0322074 A1 | 11/2017 | Corrain et al. | |

FOREIGN PATENT DOCUMENTS

| | | |
|---|---|---|
| CN | 105115474 A | 12/2015 |
| CN | 105319555 A | 2/2016 |
| CN | 105759253 A | 7/2016 |
| CN | 106019296 A | 10/2016 |
| CN | 106324582 A | 1/2017 |
| CN | 205899006 U | 1/2017 |
| EP | 3136050 A1 | 3/2017 |
| WO | 2015024648 A1 | 2/2015 |

* cited by examiner

US 11,802,762 B2

LASER-BASED MEASUREMENT DEVICE AND MOVABLE PLATFORM

CROSS-REFERENCE TO RELATED APPLICATIONS

This application is a continuation application of U.S. patent application Ser. No. 16/587,495, filed on Sep. 30, 2019, which is a continuation application of International Application No. PCT/CN2017/078619, filed on Mar. 29, 2017, the entire contents of both of which are incorporated herein by reference.

TECHNICAL FIELD

The present disclosure relates to the technology field of sensors and, more particularly, to a laser-based measurement device and a movable platform.

BACKGROUND

In related technologies, a laser-based measurement device include a laser transmitter that transmits a laser beam (or laser light) to a lens, and the lens reflects the laser beam to an object to be measured. At the same time, the lens is driven to rotate by a motor. A laser receiver receives the laser beam reflected by the object, thereby performing a measurement related to the object, such as measuring a distance, or performing a survey. In related technologies, however, the volume of the laser-based measurement device is typically bulky, in particular, the thickness of the laser-based measurement device in an axial direction is large. Thus, the current technology cannot provide a compact laser-based measurement device.

SUMMARY

In accordance with an aspect of the present disclosure, there is provided a laser-based measurement device. The laser-based measurement device includes a motor comprising a hollow shaft. The laser-based measurement device also includes a laser transmitter disposed in the hollow shaft. The laser-based measurement device also includes an optical device disposed at the motor. The motor is configured to drive the optical device to rotate. The optical device is configured to guide a laser beam transmitted by the laser transmitter out of the hollow shaft, or to guide the laser beam reflected by an external environment into the hollow shaft.

In accordance with another aspect of the present disclosure, there is provided a laser-based measurement device. The laser-based measurement device includes a laser transmitter configured to emit a laser beam. The laser-based measurement device also includes a laser receiver configured to receive the laser beam. The laser-based measurement device also includes an optical device configured to guide the laser beam transmitted by the laser transmitter out of the laser-based measurement device, or to guide the laser beam reflected by an external environment into the laser receiver. The laser-based measurement device also includes a motor configured to drive the optical device to rotate. The laser-based measurement device further includes a driving device comprising a first magnetic member and a second magnetic member, the first magnetic member connected with the optical device, the driving device configured to cause the first magnetic member and the second magnetic member to interact with one another to drive the optical device to vibrate to change a guiding direction of the laser beam passing through the optical device.

In accordance with another aspect of the present disclosure, there is provided a laser-based measurement device. The laser-based measurement device includes a laser transmitter configured to transmit a laser beam. The laser-based measurement device also includes a laser receiver configured to receive the laser beam. The laser-based measurement device also includes an optical device configured to guide the laser beam transmitted by the laser transmitter out of the laser-based measurement device, or to guide the laser beam reflected by an external environment into the laser receiver. The laser-based measurement device also includes a motor configured to drive the optical device to rotate. The laser-based measurement device also includes a driving device configured to drive the optical device to vibrate to change a guiding direction of the laser passing through the optical device. The laser-based measurement device further includes an angle detection device statically disposed relative to a stator of the motor and configured to detect a vibration angle of the optical device.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

DETAILED DESCRIPTION OF THE EMBODIMENTS

Figure 1:
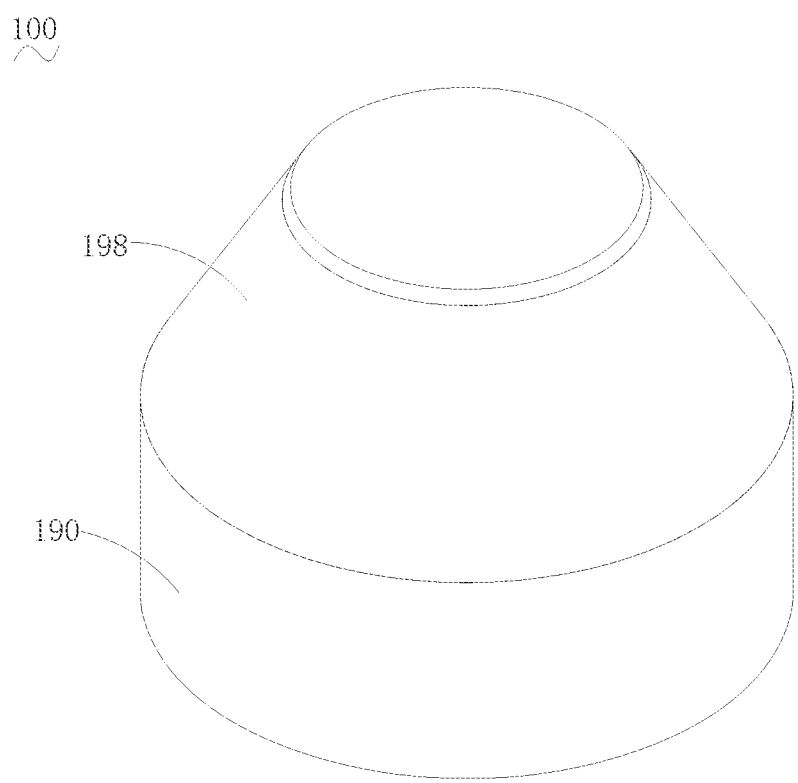
FIG. 1 is a perspective view of a laser-based measurement device, according to an example embodiment.

Technical solutions of the present disclosure will be described in detail with reference to the drawings, in which the same numbers refer to the same or similar elements unless otherwise specified. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

In the present disclosure, when terms such as "center," "longitudinal," "lateral," "length," "width," "thickness," "above," "upper," "below," "lower," "back," "left," "right," "vertical," "horizontal," "top," "bottom," "inside," "outside," "internal," "external," "clockwise," "counter-clockwise" are used to indicate orientational or positional relationship that is based on the orientation or positional relationship as shown in the drawings, it is for the convenience of describing various embodiments and for the simplification of the descriptions. Such terms do not indicate or imply a related device or element necessarily has the specified orientation, or is structurally configured in the specified orientation or is operated in the specified orientation. Thus, these terms are for illustrative purposes only and are not intended to limit the scope of the present disclosure. It should be understood that in the present disclosure, relational terms such as first and second, etc., are only used to distinguish an entity or operation from another entity or operation, and do not necessarily imply that there is an actual relationship or order between the entities or operations. Therefore, a "first" or "second" feature may include, explicitly or implicitly, one or more such features. The term "multiple" means two or more than two, unless otherwise defined.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless. When a first component is referred to as "disposed," "located," or "provided" on a second component, the first component may be directly disposed, located, or provided on the second component or may be indirectly disposed, located, or provided on the second component via an intermediate component. When a first component is referred to as "disposed," "located," or "provided" in a second component, the first component may be partially or entirely disposed, located, or provided in, inside, or within the second component.

In the present disclosure, unless otherwise explicitly defined, when a first feature is described as being disposed on or below a second feature, the first feature and the second feature may directly contact one another, or may not directly contact one another. In some embodiments, the first feature may indirectly contact the second feature through one or more other features. When a first feature is described as being disposed "at" a second feature, the first feature may be disposed at any suitable position and/or orientation relative to the second feature, such as in the second feature, on the second feature, below the second feature, connected to the second feature from a side, etc. When a first feature is described as being disposed "above," or "over," "below," or "under" the second feature, the positional configuration includes the first feature being right above or over the second feature, being right below or under the second feature, being above or over the second feature at any location other than being right above or over the second feature, and being blow or under the second feature at any location other than being right below or under the second feature. The terms "above," "over," "below," or "under" may also be used to only indicate that the first feature is located higher or lower than the second feature relative to a horizontal reference plane.

The following describe various embodiments or examples for realizing various structures of the present disclosure. For simplicity, only some example devices and configurations are described below. These descriptions are for illustrative purposes only, and are not intended to limit the scope of the present disclosure. In addition, the same reference numbers or characters may be used in various embodiments in the drawings. The repeated use of the same reference numbers or characters is only for simplification and clarity purposes. It does not necessarily indicate any relationship between various embodiments or configurations. The present disclosure also provides examples of manufacturing processes and/or materials. A person having ordinary skill in the art can appreciate that other suitable processes and/or materials may also be used.

The present disclosure provides a sensor configured to sense or detect information relating to an external environment, such as distance information of a target in the environment, angle information, reflection intensity information, velocity information, etc. The sensor may include a driving device, an intermediate medium, a signal receiver, and a signal transmitter. The driving device may be configured to drive at least one of the intermediate medium, the signal receiver, or the signal transmitter to move. For example, the driving device may be configured to drive at least one of the intermediate medium, the signal receiver, or the signal transmitter to rotate. The signal received by the signal receiver may be guided by the intermediate medium, and/or the signal transmitted by the signal transmitter may be guided by the intermediate medium.

In some embodiments, the sensor is a radar. The following descriptions use a laser radar as an example radar. In the laser radar, the driving device may include a motor. The intermediate medium may include at least one optical device configured to transmit and/or guide an optical signal. The signal receiver may be a laser receiver configured to detect or receive a laser signal (e.g., a laser beam). The signal transmitter may be a laser transmitter configured to transmit or emit a laser signal (e.g., a laser beam).

Referring to FIG. 1-FIG. 4, in some embodiments, a laser-based measurement device 100 may include a motor 102, a laser transmitter (or emitter) 104, and an optical device 106.

In some embodiments, the motor may include a hollow shaft 108. The laser transmitter 104 may be configured to fixedly provided in the hollow shaft 108. The optical device 106 may be coupled with the motor 102. The motor 102 may be configured to drive the optical device 106 to rotate. The optical device 106 may be configured to guide the laser beam emitted by the laser transmitter 104 out of the hollow shaft 108. In some embodiments, the optical device 106 may be configured to guide a laser beam reflected by the external environment back into the hollow shaft 108.

In some embodiments, in the laser-based measurement device 100, because the laser transmitter 104 is provided in the hollow shaft 108 of the motor 102, a dimension in the axial direction of the laser-based measurement device 100 is reduced, thereby realizing a compact design of the laser-based measurement device. In addition, by guiding the laser beam out of or into the hollow shaft 108, the structure of the laser-based measurement device can be made compact.

In some embodiments, the laser-based measurement device 100 may be applied to a movable platform. For example, the laser-based measurement device 100 may be mounted to a main body of the movable platform. The movable platform perform a measurement of an external environment through the laser-based measurement device. For example, the laser-based measurement device 100 may be configured to measure a distance between the movable platform and an obstacle, which may be used for obstacle avoidance. As another example, the laser-based measurement device 100 may be configured to perform a two-dimensional or three-dimensional survey of the external environment.

In some embodiments, the movable platform may include at least one of an unmanned aircraft, a vehicle, or a remote control vehicle. When the laser-based measurement device 100 is implemented in an unmanned aircraft, the main body of the movable platform may be the aircraft body of the unmanned aircraft. When the laser-based measurement device 100 is implemented in a vehicle, the movable platform may be the vehicle body of the vehicle. When the laser-based measurement device 100 is implemented in a remote control vehicle, the movable platform may be the vehicle body of the remote control vehicle.

Figure 2:
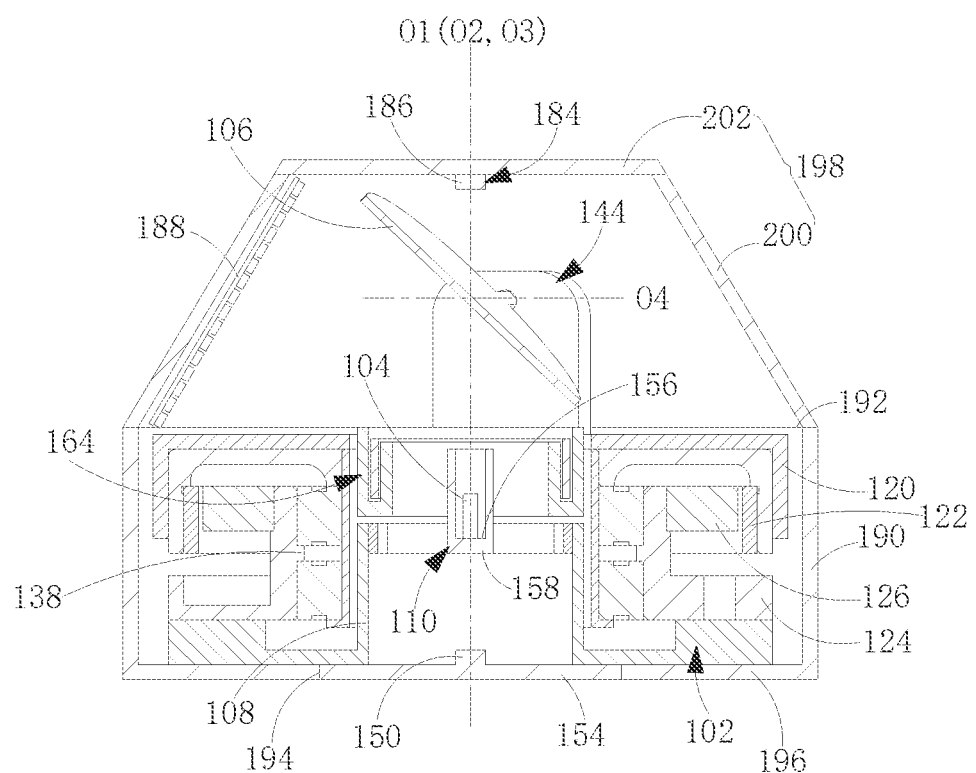
FIG. 2 is a cross-sectional view of the laser-based measurement device, according to an example embodiment.
Figure 3:
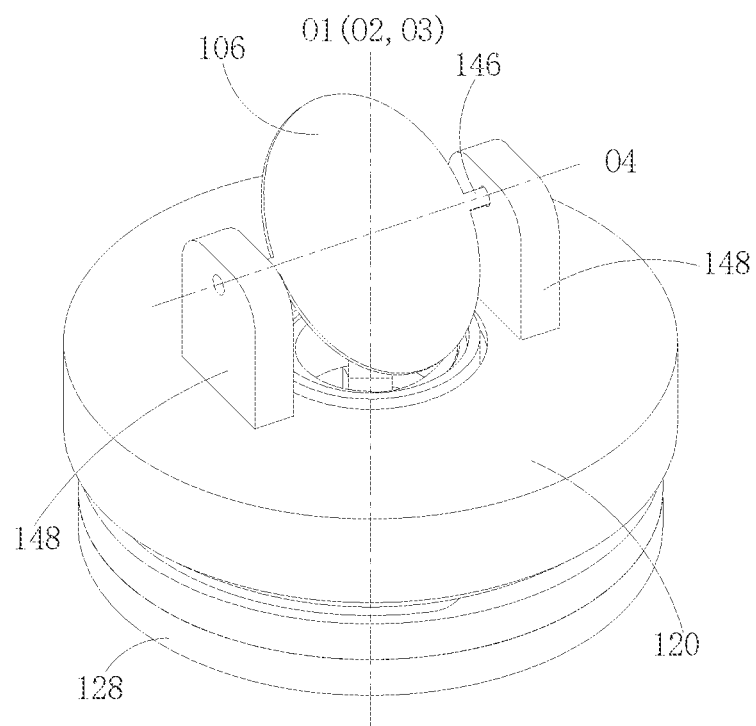
FIG. 3 is a perspective view of a portion of the laser-based measurement device, according to an example embodiment.
Figure 4:
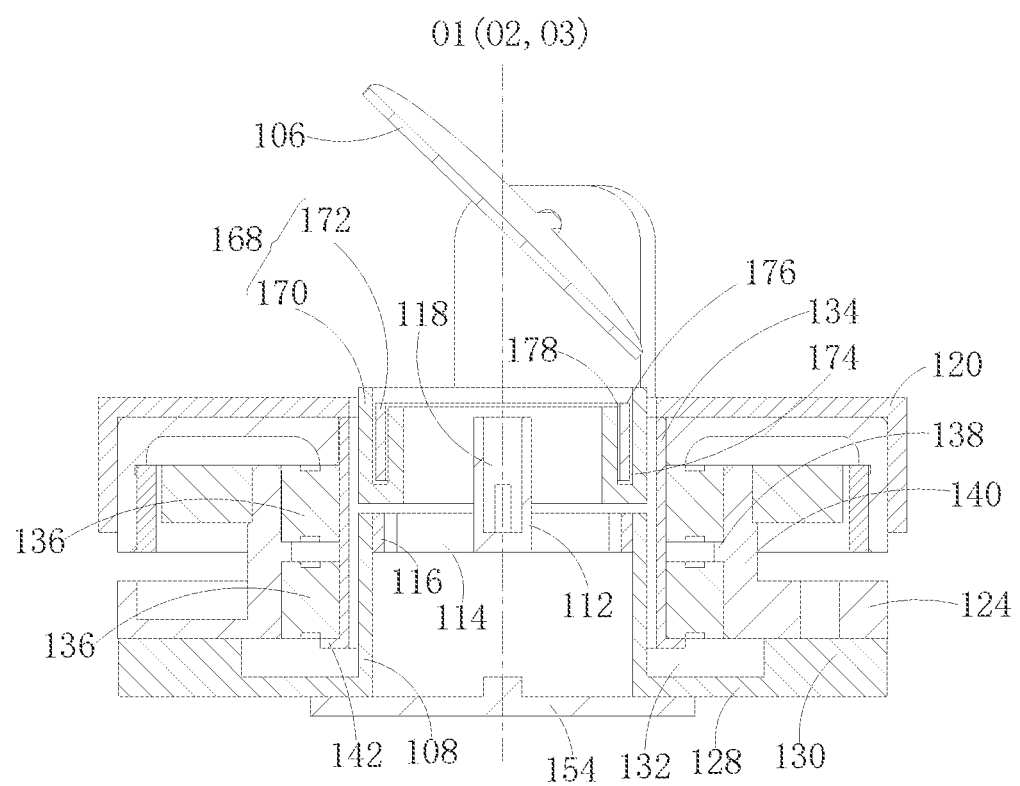
FIG. 4 is a cross-sectional view of the laser-based measurement device, according to an example embodiment.

In some embodiments, as shown in FIG. 2, FIG. 3, and FIG. 4, the laser transmitter 104 may be fixed inside the hollow shaft 108 through a mounting member 110. As shown in FIG. 2 and FIG. 4, the mounting member 110 may include a fixing column 112 configured to fix or secure the laser transmitter 104, a connecting arm 114, and a fixing ring 116. The fixing column 112 may be disposed in the fixing ring 116. The connecting arm 114 may be configured to connect the fixing column 112 and the fixing ring 116. The fixing ring 116 may be configured to fixedly connect with an inner surface of the hollow shaft 108. Through the disclosed structures, the laser transmitter 104 may be fixedly mounted in the hollow shaft 108. In some embodiments, the fixing column 112 may include a receiving groove 118. The laser transmitter 104 may be provided in the receiving groove 118, such that it is convenient to install or mount the laser transmitter 104. In some embodiments, the fixing column 112 has a cylindrical shape.

Figure 5:
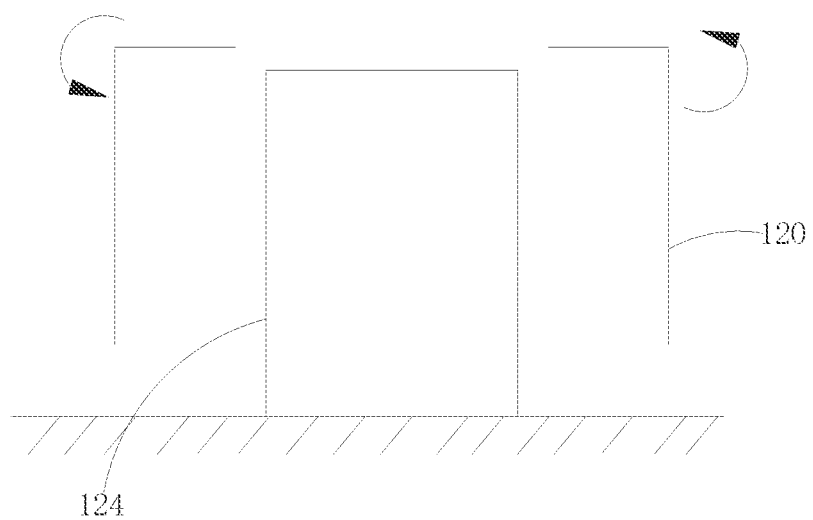
FIG. 5 is a schematic diagram of a motor of the laser-based measurement device, according to an example embodiment.
Figure 6:
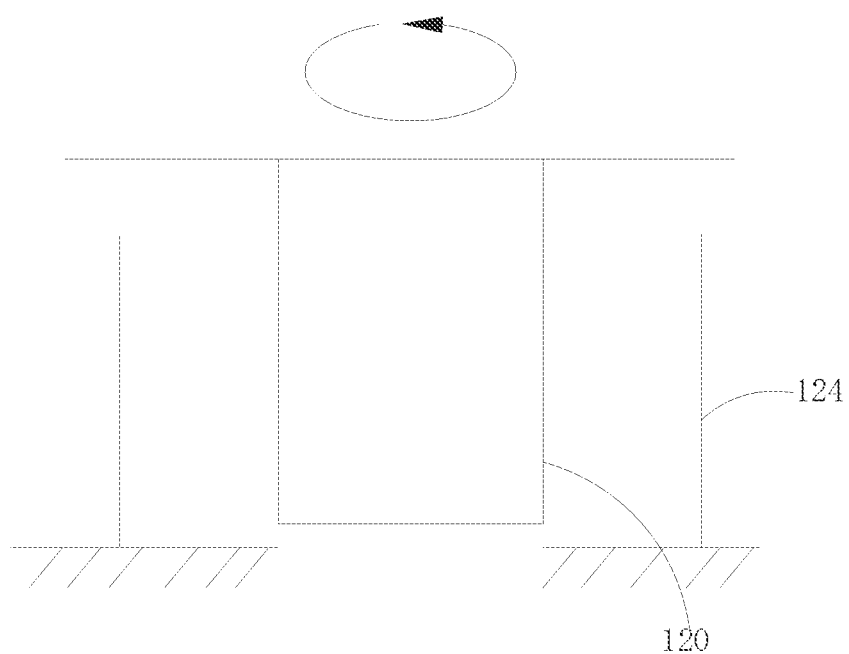
FIG. 6 is a schematic diagram of a motor of the laser-based measurement device, according to another example embodiment.

In some embodiments, the motor 102 may be an external rotor motor. As shown in FIGS. 2 and 5, the motor 102 may include a rotor 120. The rotor 120 may include a magnet 124 disposed at an outer side of a coil winding 126 of a stator 124 of the motor 102. In some embodiments, as shown in FIG. 6, the motor 102 may be an internal rotor motor. The magnet of the rotor 120 may be disposed at an inner side the coil winding of the stator 124.

In some embodiments, as shown in FIG. 4, the hollow shaft 108 may be disposed on a base 128 of the motor 102. In the embodiment shown in FIG. 4, the motor 102 is an external rotor motor. The stator 124 of the motor 102 may be fixedly disposed on the base 128. In some embodiments, the base 128 may be provided with a boss 130. The stator 124 may be fixed onto the boss 130. A space or gap 132 may be formed between a bottom surface of rotor 124 and a top surface of the base 128. The gap 132 may increase the heat dissipation efficiency of the motor 102, and reduce or avoid friction between the rotor 120 and the base 128.

In some embodiments, the hollow shaft 108 may be disposed on the base 128. The hollow shaft 108 may be perpendicularly disposed on the base 128 to reduce the volume of the motor 102. In some embodiments, the hollow shaft 108 may be disposed concentrically with the stator 124, which may further reduce the volume of the motor 102.

In some embodiments, the stator 124 and the rotor 120 of the motor 102 may be rotatably coupled with one another. In some embodiments, as shown in FIG. 4, the rotor 120 may include a hollow rotor shaft 134. The rotor shaft 134 may be rotatably coupled with the stator 124 through a bearing 136. The rotatable coupling through the bearing 136 is simple and reliable.

In some embodiments, one or more bearings 136 may be included. For example, in some embodiments, there may be two bearings 136 disposed spaced from one another. The stator 124 may include a position limiting member 138 clamped by the two bearings 136. The position limiting member 138 may maintain a horizontal level of the rotor 120 when the rotor 120 rotates. In some embodiments, the stator 124 may include a hollow stator shaft 140 disposed outside of the circumference of the rotor shaft 134. The position limiting member 138 may have a continuous ring shape, or a discrete or discontinuous ring shape, and may protrude from an inner surface of the stator shaft 140. The inner surface of the stator shaft 140 may be fixedly coupled with outer rings of the bearings 136, and an outer surface of the rotor shaft 134 may be fixedly coupled with inner rings of the bearings 136. The position limiting member 138 may be clamped by two outer rings of two bearings 136. The two bearings 136 may be disposed spaced from one another along a rotation axis O1 of the rotor 120.

In some embodiments, to better secure the bearing 136, a carrying member 142 may protrude outwardly from an end of the rotor shaft 134. One of the bearings 136 that is located at the lower position may be carried by the carrying member 142.

In some embodiments, the rotor shaft 134 may at least partially sleeve-fit with the hollow shaft 108. In some embodiments, the rotor shaft 134 may be rotatably and concentrically disposed surrounding the hollow shaft 108 with a gap. The disclosed structure may reduce the resisting force exerted on the rotor 120 when the rotor 120 rotates.

In some embodiments, an axis O2 of the hollow shaft 108 may be co-axial with a rotation axis O1 of the rotor 120. This configuration may reduce the volume of the motor 102. In some embodiments, the axis O2 of the hollow shaft 108, the rotation axis O1 of the rotor 120, and the axis of the stator

124 may be co-axial. In some embodiments, the hollow shaft 108, the stator shaft 140, and the rotor shaft 134 may all have a hollow cylindrical shape. The rotor 120 may rotate around the axis of the rotor shaft 134. In other words, the rotation axis O1 of the rotor 120 may be co-axial with the axis of the rotor shaft 134.

In some embodiments, the optical device 106 may include one piece, two pieces, or more than two pieces, and may be configured to carry out a complex optical scanning motion.

In some embodiments, the optical device 106 may include at least one of: a reflective device for reflecting the laser beam or a refractive device for refracting the laser beam. The optical device 106 may be selected such that the cost for the laser-based measurement device 100 may be minimized.

In some embodiments, the optical device 106 may include a reflective device. The reflective device may reflect the laser beam generated by the laser transmitter 104 to the external environment. The reflective device may also be configured to reflect the laser beam reflected by the external environment back into the hollow shaft 108. When the laser-based measurement device 100 operates, the laser transmitter 104 may transmit a laser beam to the reflective device, and the reflective device may reflect the laser beam to the external environment. The motor 102 may drive the reflective device to rotate, such that the laser beam reflected by the reflective device scans within an optical scanning region around the rotation axis of the reflective device. The light (e.g., laser beam) reflected by the reflective device may be reflected back by the external environment, and the reflective device reflects the light reflected by the external environment into the hollow shaft 108. The light reflected back by the external environment may be detected, thereby realizing the measurement of the external environment. When the reflective device rotates 360 degrees, a 360-degree optical scanning region can be formed. In some embodiments, the reflective device includes a reflective lens. The reflective lens may include a suitable material, or may include a thin piece manufactured using a MEMS (micro electro-mechanical system) process.

In some embodiments, the optical device 106 includes a refractive device. The refractive device may be configured to refract the laser beam transmitted by the laser transmitter 104 to the external environment, and to refract the laser beam reflective back by the external environment into the hollow shaft 108. When a light passes a refractive device, the light path is altered as compared to the original light path before the light enters the refractive device. When the motor 102 drives the refractive device to rotate 360 degrees, the light having an altered path may form an optical scanning region having a light spot shape. The light spot may be projected to the external environment. In some embodiments, the refractive device includes a concave lens.

In some embodiments, as shown in FIG. 2, the optical device 106 may be disposed outside of the hollow shaft 108. As such, a larger scanning region may be formed.

For example, the motor 102 may include a supporting member 144. The optical device 106 may include or be connected with a supporting part 146. The optical device 106 may be mounted to the supporting member 144 through the supporting part 146. The supporting member 144 may include two supporting arms 148 spaced apart from one another. The two supporting arms 148 may provide stable support to the optical device 106. In some embodiments, the rotor 120 of the motor 102 may rotate to cause the optical device 106 to rotate through the supporting member 144 fixedly connected with the rotor 120.

In some embodiments, the motor 102 may cause the optical device 106 to rotate through a suitable transmission mechanism. For example, the laser-based measurement device 100 may include a transmission mechanism connected between the rotor 120 of the motor 102 and the optical device 106. The rotor 120 of the motor 102 may cause the optical device 106 to rotate through the transmission mechanism.

In some embodiments, the transmission mechanism may include at least one of a gear or a conveyor belt. When the transmission mechanism includes at least one gear, the number of gears may be one or more than one. Multiple gears may include a driving gear and a driven gear. The driving gear may be fixedly connected with the rotor 120 of the motor 102. The driven gear may be fixedly connected with the optical device 106. The driving gear and the driven gear may engage with one another directly, or may be engaged with one another through one or more other gears or gear sets. When the rotor 120 rotates, the gears may transmit the rotating energy to the optical device 106, thereby driving the optical device 106 to rotate.

In some embodiments, when the transmission mechanism includes a conveyor belt, the rotor 120 may be fixedly connected with a first conveying disk. The optical device 106 may be fixedly connected with a second conveying disk. The first conveying disk and the second conveying disk may be connected by the conveyor belt. The rotation of the rotor 120 may cause the first conveying disk to rotate, thereby causing the optical device 106 to rotate through the conveyor belt and the second conveying disk.

In some embodiments, when the transmission mechanism includes a gear and a conveyor belt, the connections between the various elements can refer to the above descriptions of the two connection methods.

In some embodiments, the optical device 106 may be disposed in the hollow shaft 108. For example, the motor 102 may include the supporting member 144 fixedly disposed in the hollow shaft 108. The optical device 106 may be connected with a supporting part 146. The optical device 106 may be mounted to the supporting member 144 through the supporting part 146.

In some embodiments, the laser-based measurement device 100 may include a laser receiver 150 configured to receive light guided into the hollow shaft 108 by the optical device 106. For example, in some embodiments, the laser transmitter 104 may include a laser diode, and the laser receiver 150 may include a photo diode. When the laser-based measurement device 100 operates, the light reflected by the external environment may be guided or directed into the hollow shaft 108 through the optical device 106. The light may be received by the laser receiver 150, which may output a corresponding electrical signal. The electrical signal may be processed and analyzed to obtain a measurement of the external environment.

Figure 7:
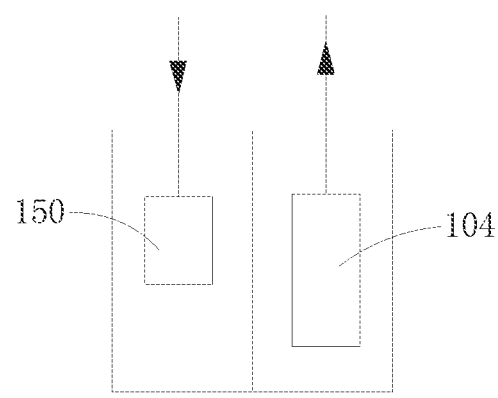
FIG. 7 is a schematic diagram of a positional relationship between a laser transmitter and a laser receiver of the laser-based measurement device, according to an example embodiment.

In some embodiments, referring to FIG. 2 and FIG. 7, the laser receiver 150 and the optical device 106 may be two adjacent elements on the light path of the light guided into the hollow shaft 108 by the optical device 106. As such, there may not be any other elements or devices between the optical device 106 and the laser receiver 150 to reflect, refract, or block the light. With the disclosed structure, the intensity of the light received by the laser receiver 150 may be high, which may be desirable for performing a measurement by the laser-based measurement device 100.

Figure 8:
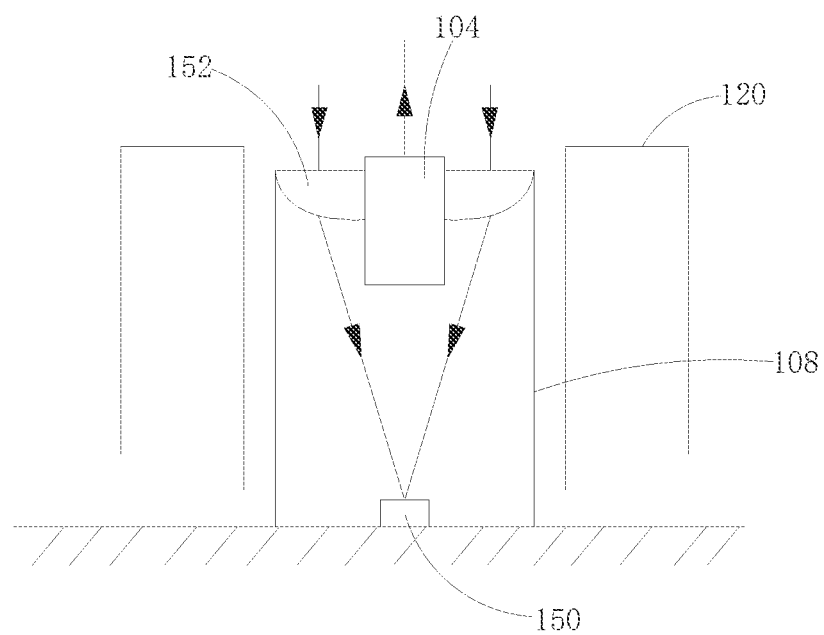
FIG. 8 is a schematic diagram of a positional relationship between a laser transmitter and a laser receiver of the laser-based measurement device, according to another example embodiment.
Figure 9:
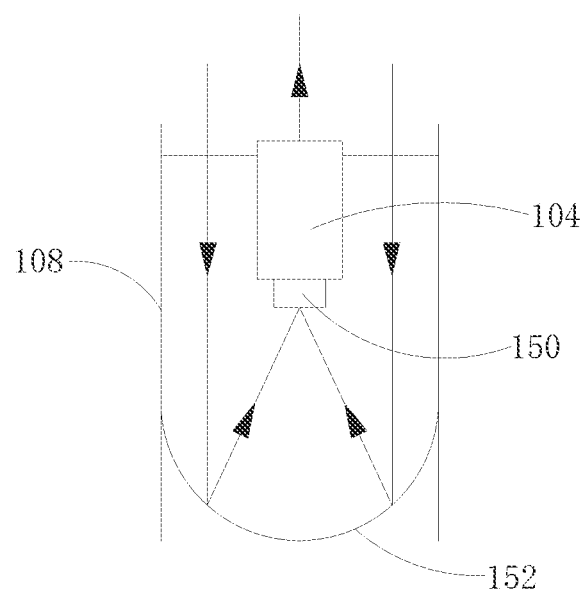
FIG. 9 is a schematic diagram of a positional relationship between a laser transmitter and a laser receiver of the laser-based measurement device, according to another example embodiment.

In some embodiments, referring to FIG. 8 and FIG. 9, the laser-based measurement device 100 may include a converging lens 152 configured to focus the laser beam guided into the hollow shaft 108 by the optical device 106 onto the laser receiver 150. As such, by converging the light through the converging lens 152, the laser receiver 150 may receive flight reflected by a greater region of the external environment. In addition, the location of the laser receiver 150 may be flexible.

In some embodiments, referring to FIG. 8, the converging lens 152 may be a convex lens disposed surrounding the laser transmitter 104. The convex lens may focus the light guided into the hollow shaft 108 by the optical device 106 and located surrounding the laser transmitter 104 onto the laser receiver 150. As shown in FIG. 4, the laser-based measurement device 100 may include a circuit board 154. The hollow shaft 108 and the laser receiver 150 may be disposed on the circuit board 154. The laser transmitter 104 may be disposed above or over the circuit board 154. As such, the laser transmitter 104 may exchange data or signal with other devices or elements through the circuit board 154, and may be powered by the circuit board 154. In some embodiments, the laser transmitter 104 may be electrically connected to the circuit board 154. When the motor 102 operates, the hollow shaft 108, the laser transmitter 104, the laser receiver 150, and the electrical circuit 154 may be static relative to the stator 124 of the motor 102.

In some embodiments, as shown in FIG. 2 and FIG. 9, the laser-based measurement device 100 may include a mounting member 110 disposed in the hollow shaft 108. The mounting member 110 may include two surfaces facing against one another, a first surface 156 and a second surface 158. The laser transmitter 104 may be disposed on the first surface 156 and the laser receiver 150 may be disposed on the second surface 158. As such, the space inside the hollow shaft 108 may be fully utilized to configure the laser transmitter 104 and the laser receiver 150, which facilitate the miniaturization of the laser-based measurement device 100.

In some embodiments, as shown in FIG. 9, the converging lens 152 may be a concave mirror disposed in the hollow shaft 108. The reflective side of the concave mirror may face the laser receiver 150 and the traveling direction of the light guided by the optical device 106 into the hollow shaft 108. The concave mirror may focus the light guided by the optical device 106 into the hollow shaft 108 onto the laser receiver 150.

In some embodiments, as shown in FIG. 2, the first surface of the mounting member 110 may be a bottom surface of a receiving groove 118. The second surface 158 of the mounting member 110 may be a bottom surface of the fixing column. If the fixing column 112 does not include the receiving groove 118, the first surface 156 is the upper surface of the fixing column 112. The first surface 156 may face the optical device 106.

Figure 10:
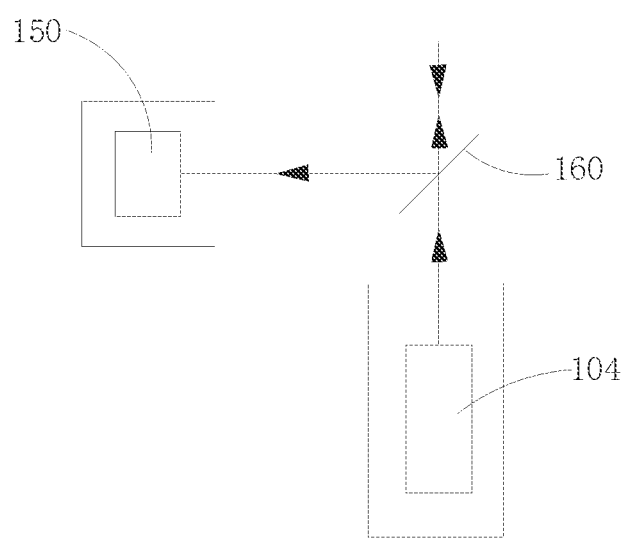
FIG. 10 is a schematic diagram of a positional relationship between a laser transmitter and a laser receiver of the laser-based measurement device, according to another example embodiment.

In some embodiments, as shown in FIG. 10, the laser-based measurement device 100 may include a combiner lens 160 disposed between the optical device 106 and the laser transmitter 104. The combiner lens 160 may be configured to pass the laser beam transmitted from the laser transmitter 104 through to the optical device 106, and to reflect the laser beam guided into the hollow shaft 108 by the optical device 106 to the laser receiver 150. As such, by including the combiner lens 160, the laser transmitter 104 and the laser receiver 150 may be vertically disposed.

In some embodiments, the combiner lens 160 may include a coating that is semi-transparent and semi-reflective. By selecting a suitable material for the coating, the transmission rate and the reflectivity of the laser beam through the combiner lens 160 may be adjusted.

Figure 11:
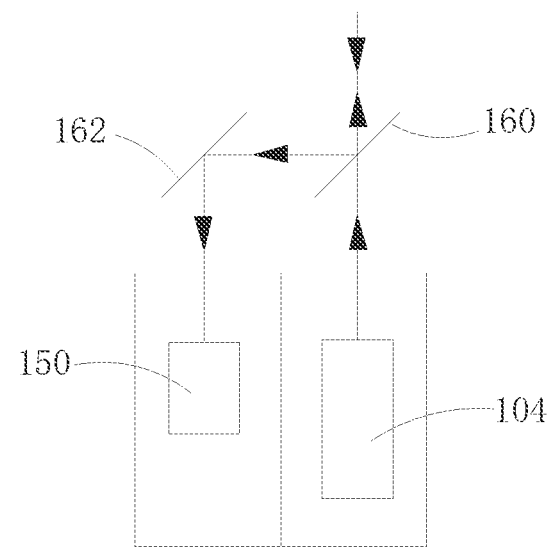
FIG. 11 is a schematic diagram of a positional relationship between a laser transmitter and a laser receiver of the laser-based measurement device, according to another example embodiment.

In some embodiments, as shown in FIG. 11, the optical device 106 may be referred to as a first optical device. The laser-based measurement device 100 may include the combiner lens 160 and a second optical device 162. The combiner lens 160 may be disposed between the first optical device and the laser transmitter 04. The combiner lens 160 may pass the laser beam transmitted by the laser transmitter 104 to the first optical device. The combiner lens 160 may also be configured to reflect the light guided into the hollow shaft 108 by the first optical device to the second optical device. The second optical device may be configured to reflect the light reflected by the combiner lens 160 to the laser receiver 150. As such, the laser transmitter 104 and the laser receiver 150 may be disposed in parallel.

Figure 12:
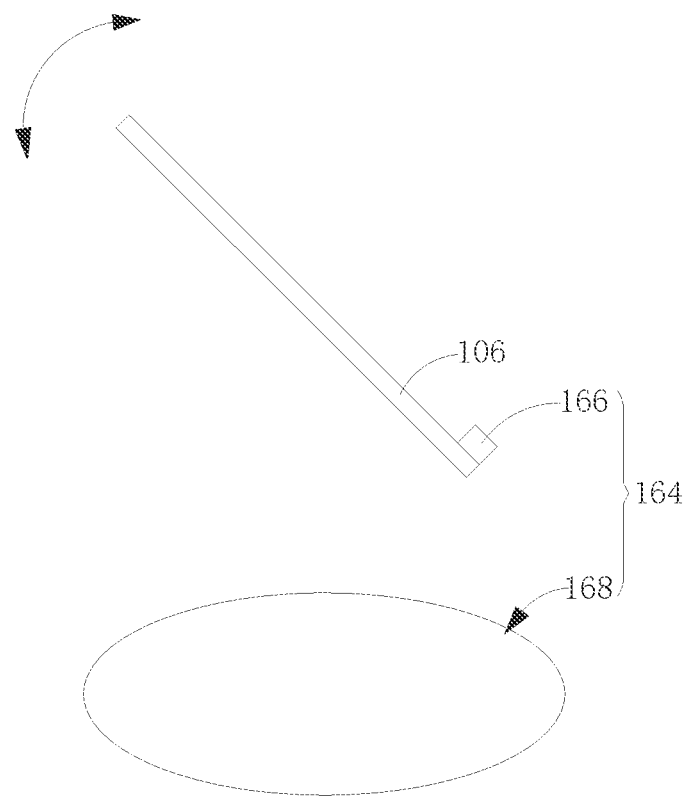
FIG. 12 is a schematic diagram of a driving device, according to an example embodiment.

In some embodiments, as shown in FIG. 2 and FIG. 12, the laser-based measurement device 100 may include a driving device 164. The optical device 106 may be disposed at the motor 102. The driving device 164 may be configured to drive the optical device 106 to vibrate. As such, the optical device 106 may change the direction of the light guided by the optical device 106 through the vibration, thereby realizing the scanning and measuring of a three-dimensional model using the laser-based measurement device 100. This may extend the application scope of the laser-based measurement device 100.

In some embodiments, the motor 102 may be configured to drive the optical device 106 to rotate around a first axis O3. The driving device 164 may be configured to drive the optical device to rotate around a second axis O4 to cause the optical device 106 to vibrate.

In some embodiments, as shown in FIG. 2 and FIG. 3, the first axis O3 and the second axis O4 may perpendicularly cross with one another. Perpendicularly crossing with one another may include perpendicularly crossing within the same plane, or perpendicularly crossing in a three-dimensional space. In some embodiments, the first axis O3 may perpendicularly cross with the second axis O4 in the same plan. This configuration may make the structure of the laser-based measurement device 100 compact.

In some embodiments, the first axis and the second axis may not be in parallel with one another. Non-parallel may include non-parallel in the same plane or in a three-dimensional space. In some embodiments, the first axis and the second axis may cross with one another. Crossing with one another may include crossing in the same plane or crossing in the three-dimensional space.

In some embodiments, as shown in FIG. 2, FIG. 4, FIG. 8, and FIG. 9, the laser transmitter 104 and the laser receiver 150 may be located on the first axis O3. In some embodiments, the laser transmitter 104 may be located on the first axis O3, and the laser receiver 150 may be located outside of the first axis O3, as shown in FIG. 7, FIG. 10, and FIG. 11. In some embodiments, the laser receiver 150 may be located on the first axis O3, and the laser transmitter 104 may be located outside of the first axis O3. The locations of the laser transmitter 104 and the laser receiver 150 may be configured based on the actual space of the laser-based measurement device 100.

In some embodiments, as shown in FIG. 3, the supporting part 146 may be elastic. The elastic supporting part 146 may stored the vibration energy of the optical device 106, may provide a resilient force, and may generate resonance. In some embodiments, the supporting part 146 may include an elastic plate. The length direction of the supporting part 146 may be the in the direction of the second axis O4. The supporting part 146 may provide a uniform resilient force to the optical device 106. In some embodiments, the optical device 106 may be configured to rotate around the second axis O4 without any resistance.

In some embodiments, the driving device 164 may include a first magnetic member 166 and a second magnetic member 168. The first magnetic member 166 may be connected with the optical device 106. The driving device 164 may be configured to cause the first magnetic member 166 and the second magnetic member 168 to engage with one another to thereby drive the optical device 106 to vibrate.

In some embodiments, the optical device 106 may be driven by a magnetic force of a magnetic field to rotate, thereby experiencing vibration. This driving method can be wireless, which avoids the sliding ring design of contact type driving methods. The disclosed driving method or structure improves the reliability of the laser-based measurement device 100.

In some embodiments, as shown in FIG. 2 and FIG. 6, the first magnetic member 166 may include a permanent magnet, and the second magnetic member 168 may include an electromagnet. The first magnetic member 166 may be disposed at a location that has very little influence on the light path of the optical device 106. For example, the first magnetic member 166 may be disposed at an edge location of a surface of the optical device 106 facing against the laser transmitter 104. The number of the first magnetic member 166 may be configured based on the needs of the driving force. The present disclosure does not limit the number of the first magnetic member 166. To cause the optical device 106 to vibrate, the electromagnet is supplied with an electric current, which produces a changing electromagnetic field. The alternate current induced changing electromagnetic field may apply a pulling force or a repelling force on the first magnetic member 166, thereby causing the optical device 106 to rotate. In some embodiments, the magnet may be ferromagnet.

In some embodiments, the first magnetic member 166 may include an electromagnet, and the second magnetic member 168 may include a permanent magnet. The first magnetic member 166 disposed on the optical device 106 may electrically contact or connect with a power supply device through a sliding ring. In some embodiments, the power supply device (not shown) may supply the electric power to the motor 102 and other electrical devices through the circuit board 154. In other words, the first magnetic member 166 may obtain the electric power for normal operation via an electrical connection with the circuit board 154 through a sliding ring.

In some embodiments, as shown in FIG. 2, the electromagnet of the second magnetic member 168 may be disposed surrounding a rotation axis of the optical device 106. As such, the electromagnet may provide a uniform magnetic force to the first magnetic member 166, which may render the optical device 106 to be more stable when vibrating. In some embodiments, the magnitude and direction of the magnetic force provided to the optical device by the electromagnet may not have a relationship with the orientation of the optical device 106 along the rotation axis of the optical device 106. This configuration may reduce the complexity of the design of the control scheme for controlling the laser-based measurement device 100 to drive the optical device 106 to vibrate. In some embodiments, the rotation axis of the optical device 106 may be the first axis O3.

In some embodiments, as shown in FIG. 2, the electromagnet may be disposed between the hollow shaft 108 and the optical device 106. The fixing column 112 may be at least partially disposed in the electromagnet. This configuration may reduce the size or dimension of the laser-based measurement device 100 in the axial direction. In some embodiments, the electromagnet may be disposed above the optical device 106, or may be disposed at other locations of the optical device 106 that do not rotate along with the rotor 120 of the motor 102.

In some embodiments, the electromagnet may be distributed symmetrically around the rotation axis of the optical device 106. As such, the electromagnet is easy to manufacture, and the space it occupies in the motor 102 may be small.

Figure 13:
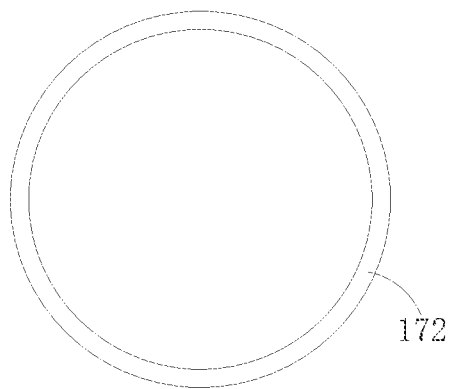
FIG. 13 is a schematic diagram of plan view of a set of coil winding, according to an example embodiment.

In some embodiments, as shown in FIG. 4 and FIG. 13, the electromagnet may include an iron core 170 and a set of coil winding 172. The iron core 170 may include a ring-shaped groove 174. The set of coil winding 172 may include a continuous ring shape, and may be at least partially disposed in the ring-shaped groove 174. In some embodiments, the iron core 170 may be a hollow cylinder. The cross-sectional shape of the iron core 170 may be a substantially U-shape. The ring-shaped groove 174 may be disposed in the circumference direction of the iron core 170. The continuous-ring shaped set of coil winding 172 is distributed in 360-degree directions around the first axis O3 such that the set of coil winding 172 provides a magnetic field in each direction to provide much more driving forces to cause the optical device 106 to vibrate. The set of coil winding 172 may be at least partially disposed in the ring-shaped groove 174. In some embodiments, the set of coil winding 172 may be completely disposed in the ring-shaped groove 174. For example, a bottom side of the set of coil winding 172 may be lower than an opting of the ring-shaped groove 174. In some embodiments, the set of coil winding 172 may be partially disposed in the ring-shaped groove 174. For example, the top side of the set of coil winding 172 may be higher than the opening 178 of the ring-shaped groove 174, as shown in FIG. 4.

Figure 14:
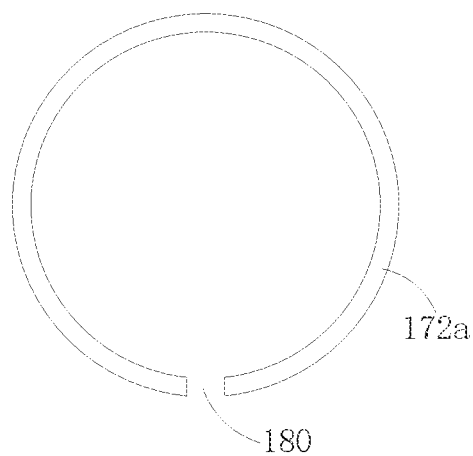
FIG. 14 is a schematic diagram of plan view of a set of coil winding, according to another example embodiment.
Figure 15:
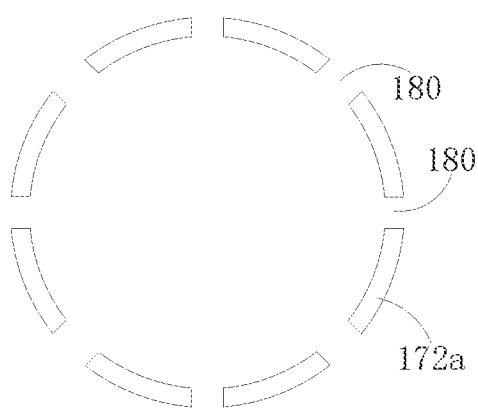
FIG. 15 is a schematic diagram of plan view of a set of coil winding, according to another example embodiment.

In some embodiments, as shown in FIG. 14 and FIG. 15, the electromagnet may include an iron core and a set of coil winding 172a. The iron core may include a ring-shaped groove. The set of coil winding 172a may have a discontinuous ring shape and may be at least partially disposed in the ring-shaped groove. In some embodiments, the structure of the iron core may be the same as, similar to, or different from the structure of the iron core 170.

The discontinuous set of coil winding 172a may be understood as the continuous ring shaped set of coil winding 172 having at least one gap 180. The discontinuous ring shaped set of coil winding 172a may be formed as shown in FIG. 14, or may be formed as shown in FIG. 15. FIG. 14 shows a gap 180 in the coil winding. FIG. 15 shows two or more gaps 180 in the coil winding.

In some embodiments, the electromagnet may not include the iron core.

In some embodiments, the laser-based measurement device 100 may include a processor connected with the second magnetic member 168. The processor may be configured to detect a counter electromotive force exerted on the second magnetic member 168 by the first magnetic member 166 to thereby obtain a vibration angle of the optical device 106. As such, the first magnetic member 166 and the second magnetic member 168 of the driving device 164 are used for detecting the vibration angle of the optical device 106, thereby realizing low cost and multi-function laser-based measurement device 100.

In some embodiments, when the optical device 106 vibrates, the position of the first magnetic member 166 relative to the second magnetic member 168 may change.

The counter electromotive force exerted by the first magnetic member 166 on the second magnetic member 168 may change as the position changes. The corresponding relationship between the position of the first magnetic member 166 and the counter electromotive force may be determined and saved, which may be later retrieved by the processor to calculate the vibration angle of the optical device 106.

In some embodiments, the vibration angle of the optical device 106 may be used to calculate a dimension and a shape of a three-dimensional model of an external environment, and to calculate a distance between the laser-based measurement device 100 and an obstacle in the external environment.

In some embodiments, as shown in FIG. 2, the laser-based measurement device 100 may include an angle detection device 184 located over or above the optical device 106 and disposed along the rotation axis of the optical device 106. The angle detection device 184 may be configured to detect the vibration angle of the optical device 106. As such, the vibration angle of the optical device 106 may be detected. In some embodiments, the rotation axis of the optical device 106 may be the first axis O3.

In some embodiments, the angle detection device 184 may be disposed statically relative to the stator 124 of the motor 102. In FIG. 2, the angle detection device 184 may include a Hall element 186. The optical device 106 may include a magnetic member. As such, through non-contact detection mechanism for detecting the vibration angle of the optical device 106, the structure of the laser-based measurement device 100 is simplified.

In some embodiments, the magnetic member included in the optical device 106 may be the first magnetic member 166. Thus, the first magnetic member 166 may be used for driving purposes and angle detection purposes. In some embodiments, the magnetic member and the first magnetic member 166 may be two separate members disposed separate from one another, adjacent one another, or connected with one another.

In some embodiments, when the optical device 106 vibrates, the position of the magnetic member relative to the Hall element 186 may change. The magnetic field of the magnetic member relative to the Hall element 186 may change correspondingly. Thus, a signal output by the Hall element 186 may change with the above changes. The corresponding relationship between the position of the magnetic member and the signal output by the Hall element 186 may be determined and saved, which may be later retrieved by the angle detection device 184 for calculating the vibration angle of the optical device 106.

In some embodiments, as shown in FIG. 2, the angle detection device 184 may include an image acquisition device 188 configured to obtain an image of the optical device and determine the vibration angle of the optical device 106 based on the image. As such, through the non-contact detection mechanism for detecting the vibration angle of the optical device 106, the structure of the laser-based measurement device 100 is simplified.

In some embodiments, when the position of the optical device 106 relative to the image acquisition device 188 changes, the image of the optical device 106 acquired by the image acquisition device 188 may change correspondingly. The corresponding relationship between the position of the optical device 106 and the image of the optical device 106 acquired by the image acquisition device 188 may be determined and saved, which may be later retrieved by the angle detection device 184 for calculating the vibration angle of the optical device 106. In some embodiments, the image acquisition device 188 may include a Charge-Coupled Device ("CCD") or Complementary Metal Oxide Semiconductor ("CMOS").

In some embodiments, the image acquisition device 188 may detect the image of the optical device using any suitable image processing technology.

In some embodiments, the image acquisition device 188 may include a linear image sensor. The linear image sensor may output relatively a smaller amount of image data, which may reduce the complexity of the image processing and analysis, hence increasing the speed of calculating the vibration angle. Furthermore, the linear image sensor may have a relatively small impact on the measurement of the dimension and shape of the three-dimensional model of the external environment. In some embodiments, the linear image sensor may include a linear CCD.

In some embodiments, the laser-based measurement device 100 may include a sliding ring and an angle detection device. The sliding ring may be electrically connected with the angle detection device. The optical device 106 may be vibratively disposed at the rotor 120 of the motor 102. The angle detection device may be disposed at the rotor 120 of the motor 102 and may be configured to detect the vibration angle of the optical device 106. As such, through the sliding ring, electric power may be provided to the angle detection device located at the rotor 120 to enable the angle detection device to detect the vibration angle of the optical device 106.

In some embodiments, the angle detection device may include at least one of the following sensors or elements: an electrical encoder, a potentiometer, a magnetic sensor, a gyroscope, or an accelerometer. In some embodiments, if the angle detection device includes two or more of an electrical encoder, a potentiometer, a magnetic sensor, a gyroscope, or an accelerometer, when calculating the vibration angle of the optical device 106, an average angle may be determined based on multiple angles calculated by based on different signals output by different sensors of the angle detection device, and the average angle may be used as the vibration angle of the optical device 106. In some embodiments, different weights may be assigned to different angles calculated based on different signals output by different sensors included in the angle detection device. The different angles may be multiplied by the different weights to obtain adjusted angles. The multiple adjusted angles may be added up to obtain a final angle, which may be used as the vibration angle of the optical device 106. In some embodiments, one or more sensors included in the angle detection device may be used as the primary detection sensors, while another one or more sensors included in the angle detection device may be used as backup detection sensors. When the primary detection sensors fail, the angle detection device may use the backup detection sensors to detect the vibration angle of the optical device 106, thereby maintaining the normal operations of the laser-based measurement device 100.

In some embodiments, the mechanism for driving the optical device 106 to vibrate may include using external air flow or sound wave to drive the optical device 106 to vibrate. Correspondingly, the laser-based measurement device 100 may include an air flow generating device and/or a sound wave generating device.

In some embodiments, as shown in FIG. 2, the laser-based measurement device 100 may include a housing 190. The motor 102 may be disposed in the housing 190. The housing 190 may include an opening 192 configured for the laser beam generated by the laser transmitter 104 and the laser beam reflected by the external environment to pass through. As such, the housing 190 may protect the motor 102, the laser transmitter 104, etc., thereby increasing the reliability of the laser-based measurement device 100.

In some embodiments, the housing 190 may include a hollow cylindrical shape. An upper end of the housing 190 may be provided with the opening 192 (also referred to as a first opening 192). A lower end of the housing 190 may be provided with a second opening 194. The size of the first opening 192 may be larger than the size of the second opening 194. The lower end of the housing 190 may include a supporting member 196 extending toward the inside of the housing 190. The second opening 194 may penetrate throughout the supporting member 196.

In some embodiments, the supporting member 196 may support the motor 102. As shown in FIG. 2, the circuit board 154 may be disposed outside of the second opening 194, such that the laser-based measurement device 100 may be connected with the other devices of the movable platform for power supply and data and signal communication. During installation or assembling, the motor 102 may be placed into the inside of the housing 190 through the first opening 192. The base 128 of the motor 102 may be fixedly mounted to the supporting member 196.

In some embodiments, as shown in FIG. 1 and FIG. 2, to further protect elements or components of the laser-based measurement device 100 located outside of the housing 190 by preventing dust and water vapor from entering into the laser-based measurement device 100, the laser-based measurement device 100 may include a cover 198. The cover 198 may be disposed on the housing 190 and may be configured to receive or accommodate the optical device 106. The cover 198 may include a light-transmissive member 200 configured to allow the laser beam transmitted by the laser transmitter 104 and the laser beam reflected by the external environment to pass through.

In some embodiments, the cover 198 and the housing 190 may be detachably and hermetically connected, which makes it convenient to mount the motor 102 and other elements or components. As shown in FIG. 2, the optical device 106 may be located outside of the hollow shaft 108. The angle detection device 184 may include the image acquisition device 188 and the Hall element 186 disposed along the first axis O3 of the optical device 106. Each of the Hall element 186 and the image acquisition device 188 may be used for detecting the vibration angle of the optical device 106. When calculating the vibration angle of the optical device 106, in some embodiments, an average angle may be determined based on two angles calculated based on the signal output by the Hall element 186 and the signal output by the image acquisition device 188, respectively. The average angle may be used as the vibration angle of the optical device 106. In some embodiments, different weights may be assigned to the two angles calculated based on the signal output by the Hall element 186 and the signal output by the image acquisition device 188, respectively. Each angle may be multiplied by the corresponding weight to obtain an adjusted angle. The two adjusted angles may be added up to obtain a final angle, which may be used as the vibration angle of the optical device 106. In some embodiments, one of the Hall element 186 and the image acquisition device 188 may be used as a primary detection device, and the other one may be used as a backup detection device. When the primary detection device fails, the laser-based measurement device 100 may use the backup detection device to detect the vibration angle of the optical device 106, thereby maintaining the normal operations of the laser-based measurement device 100.

In some embodiments, the Hall element 186 may be disposed at an inner surface of a ceiling plate 202 of the cover 198. The image acquisition device 188 may be disposed at an inner surface of the light-transmissive member 200 of the cover 198. In some embodiments, the light-transmissive member 200 of the cover 198 may include a light-transmissive plate for the laser beam transmitted by the laser transmitter 104 to pass through. In some embodiments, the light-transmissive member 200 of the cover 198 may have a horn shape. A lower end of the light-transmissive member 200 may be relatively larger and may be connected with the circumference of the first opening 192 of the housing 190. An upper end of the light-transmissive member 200 may be relatively smaller and may be connected with the ceiling plate 202 of the cover 198.

In some embodiments, the laser-based measurement device 100 may include the laser transmitter 104, the laser receiver 150, the motor 102, the optical device 106, and the driving device 164. The optical device 106 may be disposed at the motor 102. The motor 102 may drive the optical device 106 to rotate. The optical device may be configured to guide the laser beam transmitted by the laser transmitter 104 to an external environment, or guide the laser beam reflected by the external environment back to the laser receiver 150. The driving device 104 may include the first magnetic member 166 and the second magnetic member 68. The first magnetic member 166 may be connected with the optical device 106. The driving device 164 may be configured to drive the first magnetic member 166 and the second magnetic member 168 to interact with one another to drive the optical device 106 to vibrate, thereby changing the guiding direction of the laser beam that pass through the optical device 106.

In some embodiments, the laser-based measurement device 100 drive the optical device 106 to rotate back and forth through the interaction forces between magnetic fields, thereby causing the optical device 106 to vibrate. In some embodiments, the driving method may be a wireless driving method, which may not use the contact-style sliding ring design, thereby increasing the reliability of the laser-based measurement device 100.

Descriptions of the following embodiments of the laser-based measurement device 100 may refer to the descriptions of the laser-based measurement device 100 in the above embodiments.

In some embodiments, the motor 102 may be configured to drive the optical device 106 to rotate around the first axis O3, and the driving device 164 may be configured to drive the optical device 106 to rotate around the second axis O4 back and forth, thereby causing the optical device 106 to vibrate.

In some embodiments, the first axis O3 and the second axis O4 are not parallel with one another.

In some embodiments, the first axis O3 and the second axis O4 cross one another.

In some embodiments, the first axis O3 crosses the second axis O4 perpendicularly.

In some embodiments, the laser transmitter 104 is located on the first axis O3.

In some embodiments, the laser receiver 150 is located on the first axis O3.

In some embodiments, the laser-based measurement device 100 may include a transmission mechanism configured to connect the rotor 120 of the motor 102 and the optical device 106. The rotor 120 of the motor 102 may cause the optical device 106 to rotate through the transmission mechanism.

In some embodiments, the transmission mechanism may include at least one of a gear and a conveyor belt.

In some embodiments, the first magnetic member 166 includes a permanent magnet, and the second magnetic member 168 includes an electromagnet.

In some embodiments, the electromagnet is distributed around the rotation axis of the optical device 106.

In some embodiments, the electromagnet is symmetrically distributed around the rotation axis of the optical device 106.

In some embodiments, the electromagnet may include an iron core 170 and a set of coil winding 172. The iron core 170 may include a ring-shaped groove 174. The set of coil winding 172 may include a continuous ring shape, and may be at least partially disposed in the ring-shaped groove 174.

In some embodiments, the electromagnet may include an iron core 170 and a set of coil winding 172. The iron core 170 may include a ring-shaped groove 174. The set of coil winding 172 may include a discontinuous ring shape and may be at least partially disposed in the ring-shaped groove 174.

In some embodiments, the laser-based measurement device 100 may include the laser transmitter 104, the laser receiver 150, the optical device 106, the driving device 164, the motor 102, and the angle detection device 184. The motor 102 may be configured to drive the optical device 106 to rotate. The optical device may be configured to guide out the laser beam transmitted by the laser transmitter, or guide in the laser beam reflected by the external environment to the laser receiver 150. The driving device 164 may be configured to drive the optical device 106 to thereby change the guiding direction of the laser beam that passes through the optical device 106. The angle detection device 184 may be statically disposed relative to the stator 124 of the motor 102. The angle detection device 184 may be configured to detect the vibration angle of the optical device 106.

In some embodiments, the laser-based measurement device 100 may accurately measure a parameter of the external environment by detecting the vibration angle of the optical device 106.

Descriptions of the following embodiments of the laser-based measurement device 100 may refer to the descriptions of the laser-based measurement device 100 in the above embodiments.

In some embodiments, the motor 102 may be configured to drive the optical device 106 to rotate around the first axis O3, and the driving device 164 may be configured to drive the optical device 106 to rotate around the second axis O4 back and forth, thereby causing the optical device 106 to vibrate.

In some embodiments, the first axis O3 and the second axis O4 are not parallel with one another.

In some embodiments, the first axis O3 and the second axis O4 cross one another.

In some embodiments, the first axis O3 crosses the second axis O4 perpendicularly.

In some embodiments, the laser transmitter 104 is located on the first axis O3.

In some embodiments, the laser receiver 150 is located on the first axis O3.

In some embodiments, the laser-based measurement device 100 may include a transmission mechanism configured to connect the rotor 120 of the motor 102 and the optical device 106. The rotor 120 of the motor 102 may cause the optical device 106 to rotate through the transmission mechanism.

In some embodiments, the transmission mechanism may include at least one of a gear and a conveyor belt.

In some embodiments, the angle detection device 184 may include the first magnetic member 166, the second magnetic member 168, and a processor. The first magnetic member 166 may be connected with the optical device 106. The processor may be configured to detect a counter electromotive force exerted on the second magnetic member 168 by the first magnetic member 166 to thereby obtain a vibration angle of the optical device 106.

In some embodiments, the driving device 164 may include the first magnetic member 166 and the second magnetic member 168. The first magnetic member 166 may be connected with the optical device 106. The driving device 164 may be configured to cause the first magnetic member 166 and the second magnetic member 168 to interact with one another to thereby cause the optical device 106 to vibrate.

In some embodiments, the first magnetic member 166 may include a permanent magnet, and the second magnetic member 168 may include an electromagnet.

In some embodiments, the electromagnet may be distributed around the rotation axis of the optical device 106.

In some embodiments, the electromagnet may be symmetrically distributed around the rotation axis of the optical device 106.

In some embodiments, the electromagnet may include the iron core 170 and the set of coil winding 172. The iron core 170 may include a ring-shaped groove 174. The set of coil winding 172 may include a continuous ring shape, and may be at least partially disposed in the ring-shaped groove 174.

In some embodiments, the electromagnet may include the iron core 170 and the set of coil winding 172. The iron core 170 may include a ring-shaped groove 174. The set of coil winding 172 may include a discontinuous ring shape, and may be at least partially disposed in the ring-shaped groove 174.

In some embodiments, the angle detection device 184 may be disposed above the optical device 106 along the rotation axis of the optical device 106.

In some embodiments, the angle detection device 184 may include a Hall element 186. The optical device 106 may include a magnetic member.

In some embodiments, the angle detection device 184 may include an image acquisition device 188 configured to obtain an image of the optical device and determine the vibration angle of the optical device 106 based on the image. In some embodiments, the image acquisition device 188 may include a linear image sensor.

In some embodiments, the laser-based measurement device 100 may include a sliding ring. The sliding ring may be electrically connected with the driving device 164. The driving device 164 and the optical device 106 may be disposed at the rotor 120 of the motor 102.

The present disclosure also provides a movable platform including any embodiment of the disclosed laser-based measurement device 100. The movable platform may include a platform body. The laser-based measurement device 100 may be mounted on the platform body.

A person having ordinary skills in the art can appreciate that the advantages of the movable platform include the advantages of any embodiment of the laser-based measurement device.

In some embodiments, the movable platform may include at least one of an unmanned aircraft, a vehicle, and a remote control vehicle.

In some embodiments, the movable platform having the laser-based measurement device 100 may perform measurements on the external environment. The measurements may include, for example, measuring the distance between the movable platform and an obstacle, which may be used for obstacle avoidance purposes. The measurements may also include, for example, two-dimensional or three-dimensional survey of the external environment.

In some embodiments, when the laser-based measurement device 100 is implemented in an unmanned aircraft, the movable platform may be the body of the unmanned aircraft. When the laser-based measurement device 100 is implemented in a vehicle, the movable platform may be the body of the vehicle. When the laser-based measurement device 100 is implemented in a remote control vehicle, the movable platform may be the body of the remote control vehicle.

A person having ordinary skill in the art can appreciate that when the description mentions "certain embodiments," "an embodiment," "one embodiment," "some embodiments," "illustrative embodiment," "an example," "a specific example," or "some examples," it means that characteristics, structures, or features related to the embodiment or example are included in at least one embodiment or example of the present disclosure. Thus, when the description uses these or similar terms, it does not necessarily mean the same embodiment or example. Various characteristics, structures, or features of various embodiments may be combined in a suitable manner. Various characteristics, structures, or features of one embodiment may be incorporated in another embodiment.

It should be understood that in the present disclosure, relational terms such as first and second, etc., are only used for illustrative purposes, and do not necessarily imply or indicate the relative importance or imply the number of technical features described by these terms. Therefore, a "first" or "second" feature may include, explicitly or implicitly, one or more such features. The term "multiple" means two or more than two, unless otherwise defined.

The above descriptions of various embodiments of the present disclosure are illustrative, and do not limit the scope of the present disclosure. A person having ordinary skills in the art can make changes, modifications, substitutions, and variations based on the present disclosure. The scope of the present disclosure is defined by the following claims and the equivalents.

What is claimed is:

1. A laser-based measurement device comprising:
   a laser transmitter;
   a laser receiver;
   an optical device configured to:
      guide a laser beam emitted by the laser transmitter out of the laser-based measurement device, and
      guide the laser beam reflected by an external environment in the laser receiver;
   a motor including a stator and a rotor, the rotor including a hollow rotor shaft enclosed by the stator, and the motor being configured to drive the optical device to rotate around an axis; and
   a driving device including:
      a first magnetic member connected to the optical device; and
      a second magnetic member including a set of coil disposed in the hollow rotor shaft;
   wherein the driving device is configured to drive the optical device to vibrate through interaction between the first magnetic member and the second magnetic member, to change a guiding direction of the laser beam passing through the optical device.

2. The laser-based measurement device of claim 1, wherein:
   the axis is a first axis;
   the motor further includes a hollow motor shaft enclosed by the stator and the rotor;
   the laser transmitter is disposed in the hollow motor shaft;
   the laser receiver is at least partially disposed in the hollow motor shaft; and
   the driving device is configured to drive the optical device to rotate around a second axis back and forth, to cause the optical device to vibrate.

3. The laser-based measurement device of claim 2, wherein the first axis and the second axis are not parallel to one another.

4. The laser-based measurement device of claim 3, wherein the first axis and the second axis cross one another.

5. The laser-based measurement device of claim 3, wherein the first axis crosses the second axis perpendicularly.

6. The laser-based measurement device of claim 2, wherein at least one of the laser transmitter or the laser receiver is located on the first axis.

7. The laser-based measurement device of claim 2, further comprising:
   a transmission mechanism connected to the rotor of the motor and the optical device;
   wherein the rotor of the motor is configured to cause the optical device to rotate through the transmission mechanism.

8. The laser-based measurement device of claim 7, wherein the transmission mechanism includes at least one of a gear or a conveyor belt.

9. The laser-based measurement device of claim 1, wherein the first magnetic member includes a permanent magnet, and the second magnetic member includes an electromagnet.

10. The laser-based measurement device of claim 9, wherein the electromagnet surrounds a rotation axis of the optical device.

11. The laser-based measurement device of claim 10, wherein the electromagnet is symmetrical around the rotation axis.

12. The laser-based measurement device of claim 10, wherein the electromagnet includes:
   an iron core including a ring-shaped groove; and
   the set of coil winding having a continuous ring shape and at least partially disposed in the ring-shaped groove.

13. The laser-based measurement device of claim 10, wherein the electromagnet includes:
   an iron core including a ring-shaped groove; and
   the set of coil winding having a discontinuous ring shape and at least partially disposed in the ring-shaped groove.

14. The laser-based measurement device of claim 1, wherein the first magnetic member is disposed at an edge location of a surface of the optical device facing against the laser transmitter.

15. The laser-based measurement device of claim 1, wherein the second magnetic member surrounds a rotation axis of the optical device.

16. A laser-based measurement device comprising:
   a laser transmitter;
   a laser receiver;
   an optical device configured to:

guide a laser beam emitted by the laser transmitter out of the laser-based measurement device, and
guide the laser beam reflected by an external environment in the laser receiver;
a motor including a stator and a rotor, the rotor including a hollow rotor shaft enclosed by the stator, and the motor being configured to drive the optical device to rotate around an axis;
a driving device configured to drive the optical device to vibrate to change a guiding direction of the laser beam passing through the optical device, the driving device including a set of coil disposed in the hollow rotor shaft; and
an angle detection device configured to detect a vibration angle of the optical device.

17. The laser-based measurement device of claim 16, wherein:
the axis is a first axis;
the motor further includes a hollow motor shaft enclosed by the stator and the rotor;
the laser transmitter is disposed in the hollow motor shaft;
the laser receiver is at least partially disposed in the hollow motor shaft;
the driving device is configured to drive the optical device to rotate around a second axis back and forth, to cause the optical device to vibrate; and
the angle detection device is statically disposed relative to the stator of the motor.

18. The laser-based measurement device of claim 17, wherein the first axis and the second axis are not parallel to one another.

19. The laser-based measurement device of claim 18, wherein the first axis and the second axis cross one another.

20. A movable platform comprising:
a platform body; and
a laser-based measurement device mounted at the platform body and including:
a laser transmitter;
a laser receiver;
an optical device configured to:
guide a laser beam emitted by the laser transmitter out of the laser-based measurement device, and
guide the laser beam reflected by an external environment in the laser receiver;
a motor including a stator and a rotor, the rotor including a hollow rotor shaft enclosed by the stator, and the motor being configured to drive the optical device to rotate around an axis; and
a driving device including:
a first magnetic member connected to the optical device; and
a second magnetic member including a set of coil disposed in the hollow rotor shaft;
wherein the driving device is configured to drive the optical device to vibrate through interaction between the first magnetic member and the second magnetic member, to change a guiding direction of the laser beam passing through the optical device.

* * * * *